(12) United States Patent
Now

(10) Patent No.: US 7,263,961 B2
(45) Date of Patent: Sep. 4, 2007

(54) GAS DIRECTING SYSTEM AND METHOD

(76) Inventor: Leo Now, 39 El Mirasol Pl., San Francisco, CA (US) 94132

( * ) Notice: Subject to any disclaimer, the term of this patent is extended or adjusted under 35 U.S.C. 154(b) by 0 days.

(21) Appl. No.: 10/678,015

(22) Filed: Oct. 1, 2003

(65) Prior Publication Data

US 2005/0072393 A1 Apr. 7, 2005

(51) Int. Cl.
*F02M 35/10* (2006.01)
(52) U.S. Cl. .................................. 123/184.21
(58) Field of Classification Search ............ 123/184.21
See application file for complete search history.

(56) References Cited

U.S. PATENT DOCUMENTS 3,868,936 A * 3/1975 Rivere .......................... 123/445
4,050,539 A * 9/1977 Kashiwara et al. ......... 181/280
4,556,032 A * 12/1985 Miller ......................... 123/438
5,048,327 A * 9/1991 Atwood ...................... 73/118.2
6,148,782 A * 11/2000 Fuesser .................. 123/184.53

\* cited by examiner

*Primary Examiner*—Noah P. Kamen
(74) *Attorney, Agent, or Firm*—DLA Piper US LLP

(57) ABSTRACT

An gas directing/exhaust system and method are provided. The gas directing system has an gas directing mechanism. The gas directing mechanism has different embodiments. In some embodiments, the gas directing mechanism has a first pathway and a second pathway. In other embodiments, the gas directing mechanism has a second pathway and one or more first pathways located inside of the second pathway. In other embodiments, the gas directing mechanism has the first and second pathways and a third pathway inside of the second pathway.

38 Claims, 16 Drawing Sheets

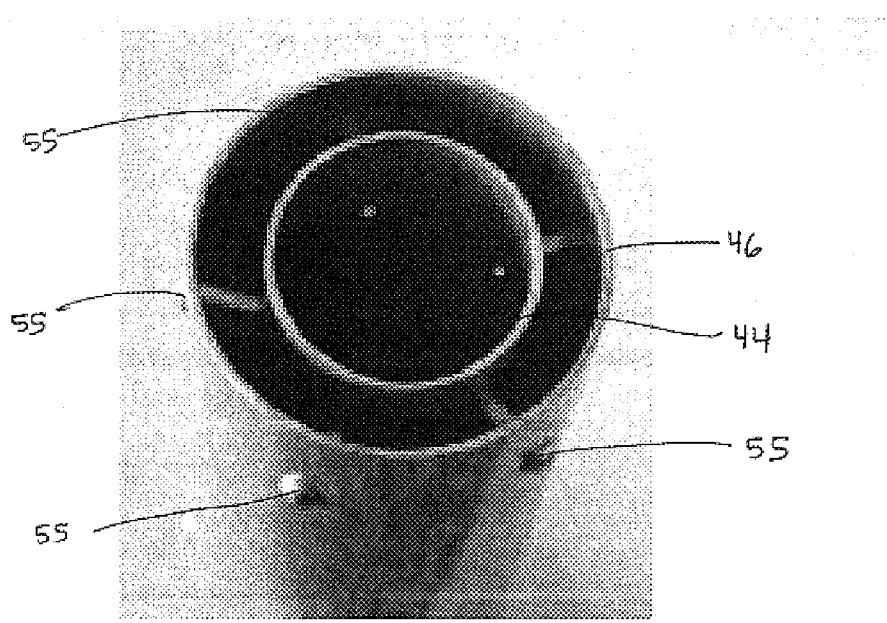
Figure 4C1
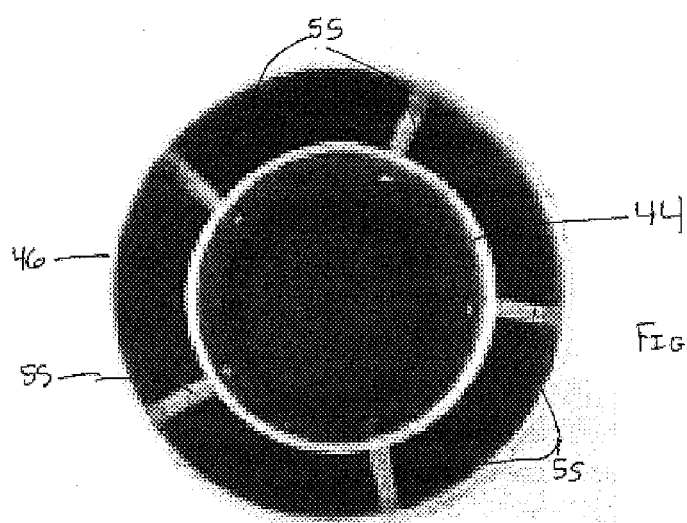
Figure 4C2

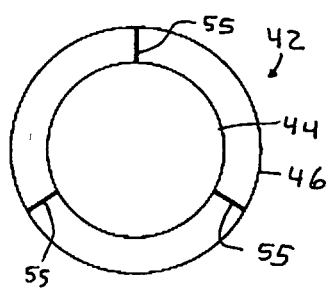
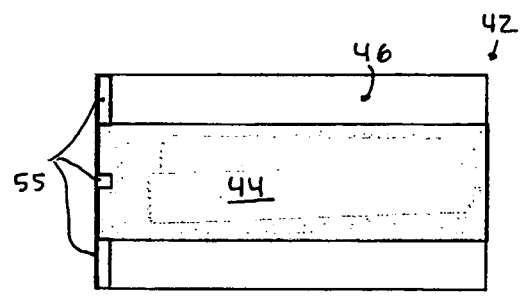
FIGURE 4G
FIGURE 4H
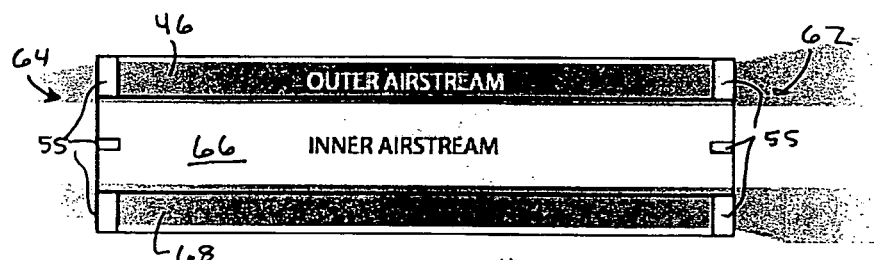
FIGURE 4I
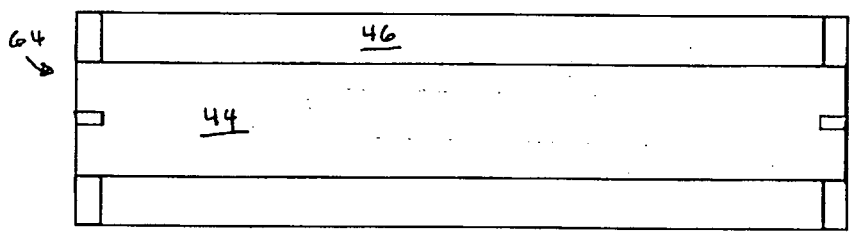
FIGURE 4J

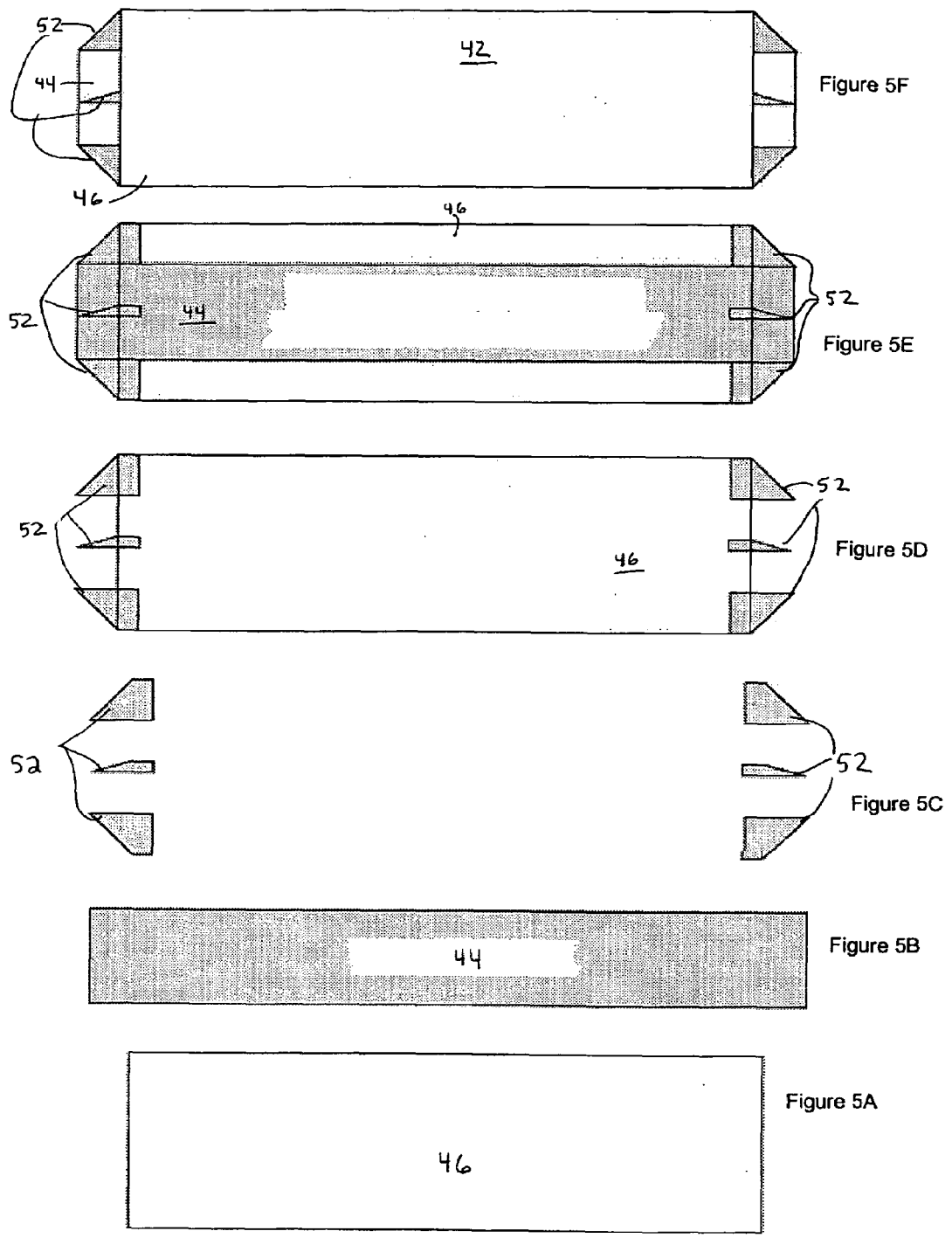

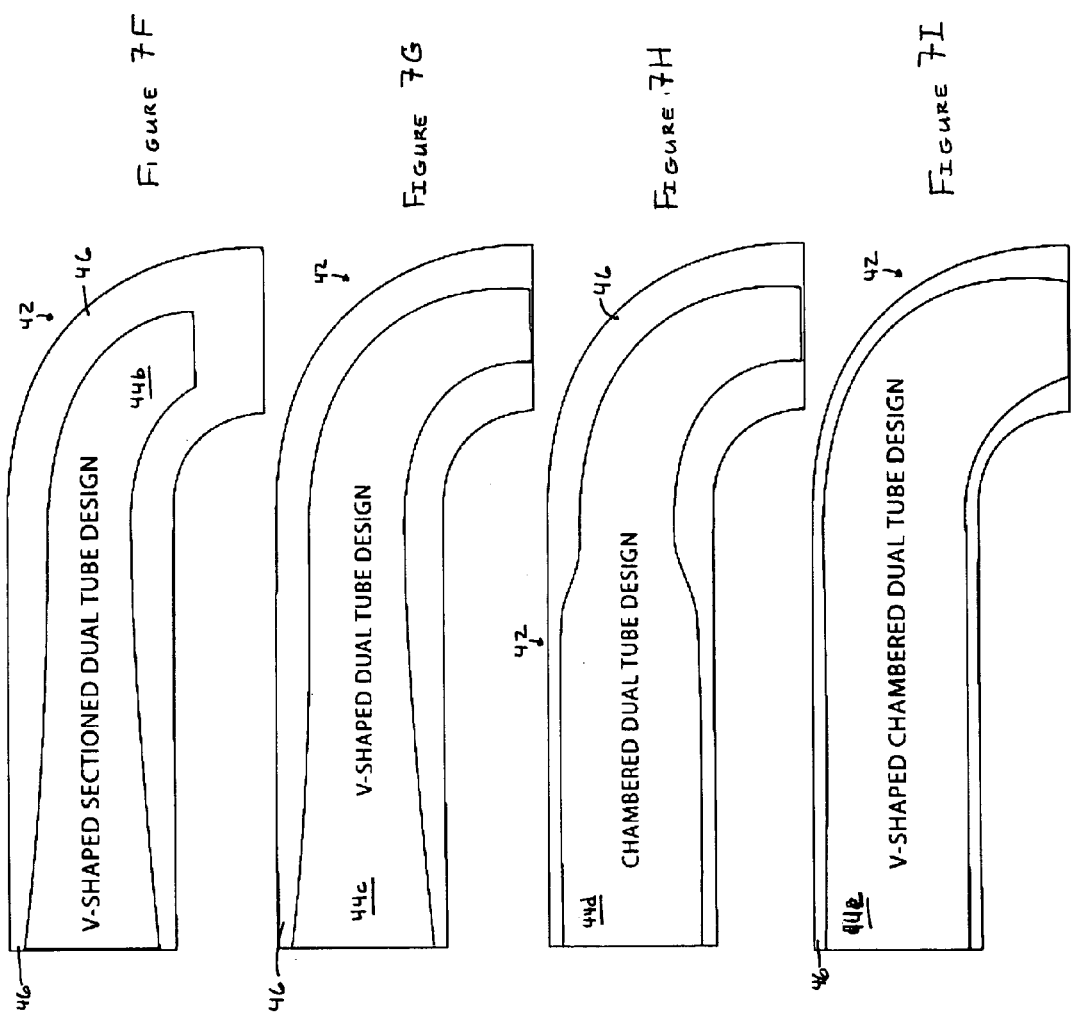

GAS DIRECTING SYSTEM AND METHOD

FIELD OF THE INVENTION

The invention relates generally to a system and method for directing a gas flow and in particular to a system and method for directing gases (intake gas or exhaust gases) in an internal combustion engine.

BACKGROUND OF THE INVENTION

It is well known that internal combustion engines require a flow of air to operate. In particular, the air and fuel are mixed together and then ignited to generate energy which translates into power, for example, to move a piston up. An internal combustion engine may be used for a variety of different purposes, including powering a vehicle, generating energy, such as a gasoline powered portable generator, and many other uses. The temperature and amount of air flowing into the internal combustion engine affects the performance of the engine as is well known.

In order to increase the performance of an internal combustion engine, the temperature and amount of air being provided to the internal combustion engine may be adjusted. For example, an automobile may be turbo charged in which the incoming air is compressed and then fed into the internal combustion engine. The turbo charging of an internal combustion engine, however, is expensive and difficult to install for anyone other than an experienced mechanic. Another less expensive option is to attempt to lower the temperature of the incoming air flow while at the same time increasing the air flow. This can be accomplished using after-market add on components which replace the original gas directing system. One example of a known system is made by AEM Power, Inc. (http://www.aempower.com). According to AEM Power, this system creates multiple frequency sound waves to help charge the cylinders with air in the upper engine RPM region. According to AEM Power, a shorter secondary pipe generates high frequency sound waves with higher engine RPMs and the smaller, longer primary pipe generates lower frequency sound waves at lower engine RPMs. This system does result in an increase in engine horsepower and torque. The same system described above may also be used to engine exhaust gases. However, the horsepower and torque gain from the AEM V2 Intake System can still be further increased. Thus, it is desirable to provide an gas directing system and method that produces more horsepower and torque, and it is to this end that the present invention is directed.

SUMMARY OF THE INVENTION

A gas directing system and method are described in which the mass of gas and velocity of the gas is increased. In a preferred embodiment of the invention, the gas directing system has a first and second pathway through which gas passes wherein the configuration of the first pathway and second pathway relative to each other results in the increased airflow and airflow velocity. In the preferred embodiment, the first and second pathways are tubes wherein the first pathway is inside of the second pathway. The first and second pathways in some embodiments are concentric. The gas directing system and method may be used with an air intake system of a vehicle or with the exhaust system of a vehicle. The gas directing system may be used with various different types of gases, including air.

Thus, in accordance with the invention, a gas directing mechanism is provided. The gas directing mechanism comprises a gas inlet into which a gas flows, a first pathway and a second pathway. The first pathway is inside of the second pathway along substantially the entire length of the second pathway so that gas from the gas inlet flows simultaneously through the first and second pathways. The gas passing through the first pathway has a first velocity and the gas passing through the second pathway has a second velocity so that the first velocity gas and the second velocity gas combine to form an output gas having a greater velocity than the gas entering the gas inlet.

In accordance with another aspect of the invention, a gas delivery mechanism is provided. The gas delivery mechanism comprises a gas inlet into which a gas flows and a gas outlet. The gas delivery mechanism also has a first pathway having a first characteristic, wherein the gas from the gas inlet flows through the first pathway and a second pathway having a second characteristic, wherein the gas from the gas inlet flows through the second pathway. The difference between the first characteristic and the second characteristic results in an increase in the airspeed of the gas at the gas outlet.

In accordance with yet another aspect of the invention, a method for increasing horsepower in an internal combustion engine is provided. In accordance with the method, a gas directing mechanism is attached to the internal combustion engine and the velocity of the air flowing out of the gas directing mechanism is increased in order to increase the horsepower of the internal combustion engine. The velocity of the air is increased by passing air through a first pathway at a first velocity and passing air through a second pathway at a second lower velocity wherein the overall velocity of the air is increased when the air from the first and second pathways are combined together.

BRIEF DESCRIPTION OF THE DRAWINGS

FIGS. 4A-4J illustrate the manufacturing steps of the preferred embodiment of the gas directing mechanism in accordance with the invention;

FIGS. 5A-5F illustrate the manufacturing steps of an embodiment of the gas directing mechanism in accordance with the invention;

FIGS. 7A-7I illustrate other embodiments of the gas directing mechanism in accordance with the invention;

DETAILED DESCRIPTION OF A PREFERRED EMBODIMENT

The invention is particularly applicable to an gas directing system for an internal combustion engine, such as a vehicle engine, and it is in this context that the invention will be described. It will be appreciated, however, that the gas directing system and method in accordance with the invention has greater utility since it may be used to direct various different gases including air and may be used with various types of internal combustion engines that are used for various different purposes. The gas directing system may also be used with any system in which it is desirable to provide increased gas flow.

Figure 1A:
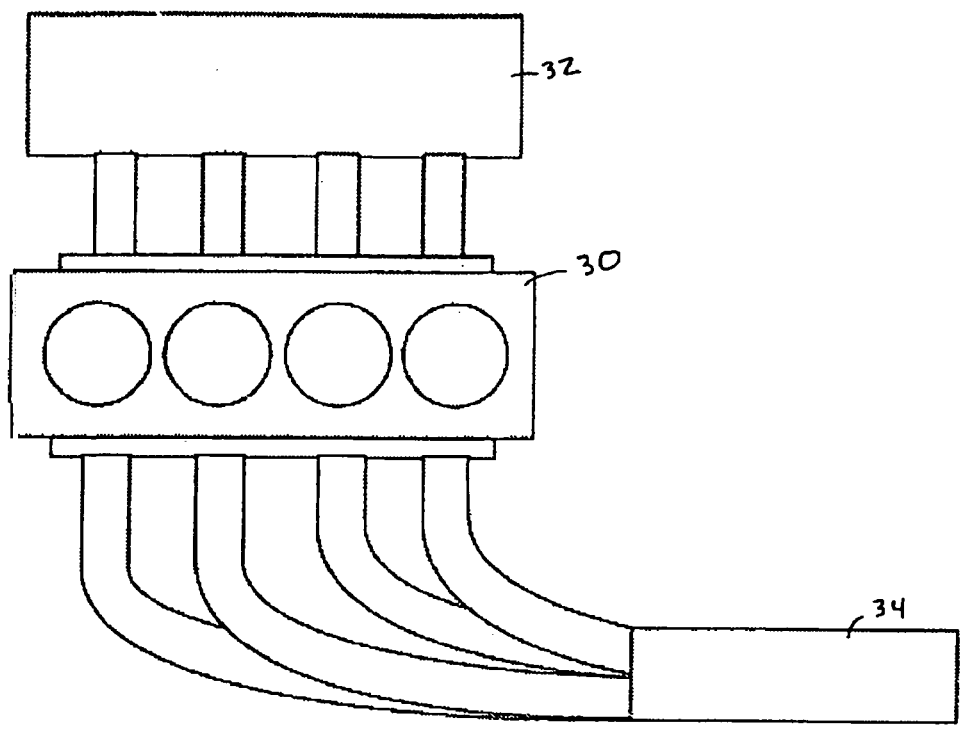
FIGS. 1A and 1B are diagrams illustrating a typical exhaust manifold and an exhaust manifold in accordance with the invention, respectively.
Figure 1B:
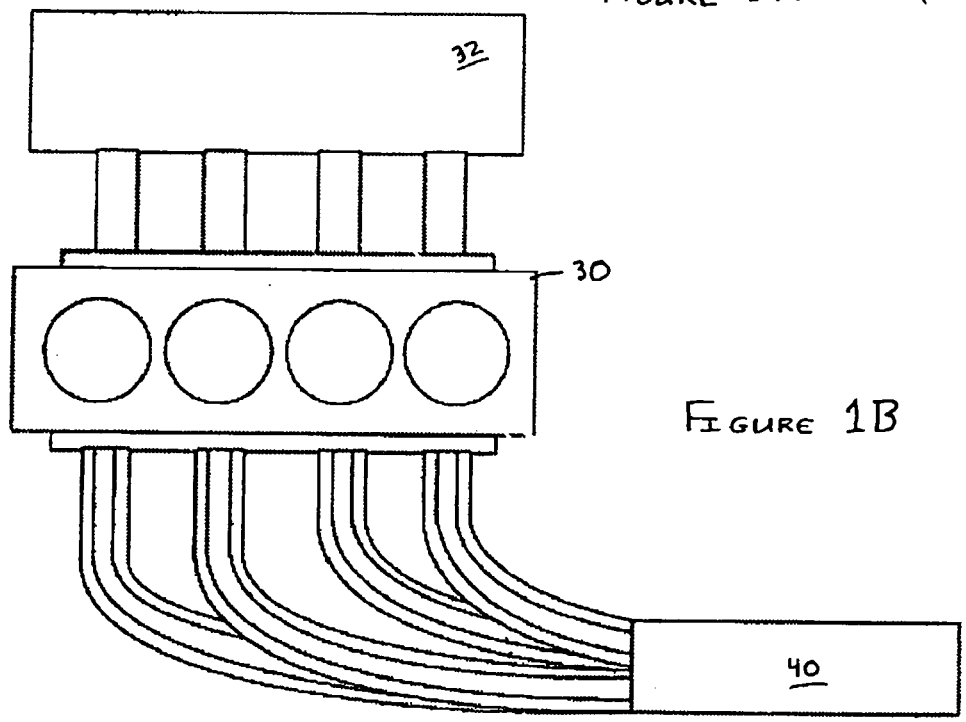

FIGS. 1A and 1B are diagrams illustrating a typical exhaust manifold for an internal combustion engine and an exhaust manifold in accordance with the invention, respectively. In particular, FIG. 1 illustrates a typical internal combustion engine 30 with a typical gas directing manifold 32 and a typical exhaust manifold 34 as are well known. The gas directing manifold 32 provides air into the internal combustion engine so that it can be mixed with fuel and ignited while the exhaust manifold 34 generates a slight back pressure and exhausts the exhaust gases out of the internal combustion engine as is well known. The gas directing system in accordance with the invention, as described below, may replace the typical gas directing system 32 or the typical exhaust system 34 to provide increased horsepower and torque for the internal combustion engine. Thus, as shown in FIG. 1B, the typical exhaust manifold 34 (shown in FIG. 1A) may be replaced by a gas directing system 40 in accordance with the invention. Thus, an embodiment of the invention in which the gas directing/exhaust system is attached to the exhaust system of an internal combustion engine is shown.

Figure 2:
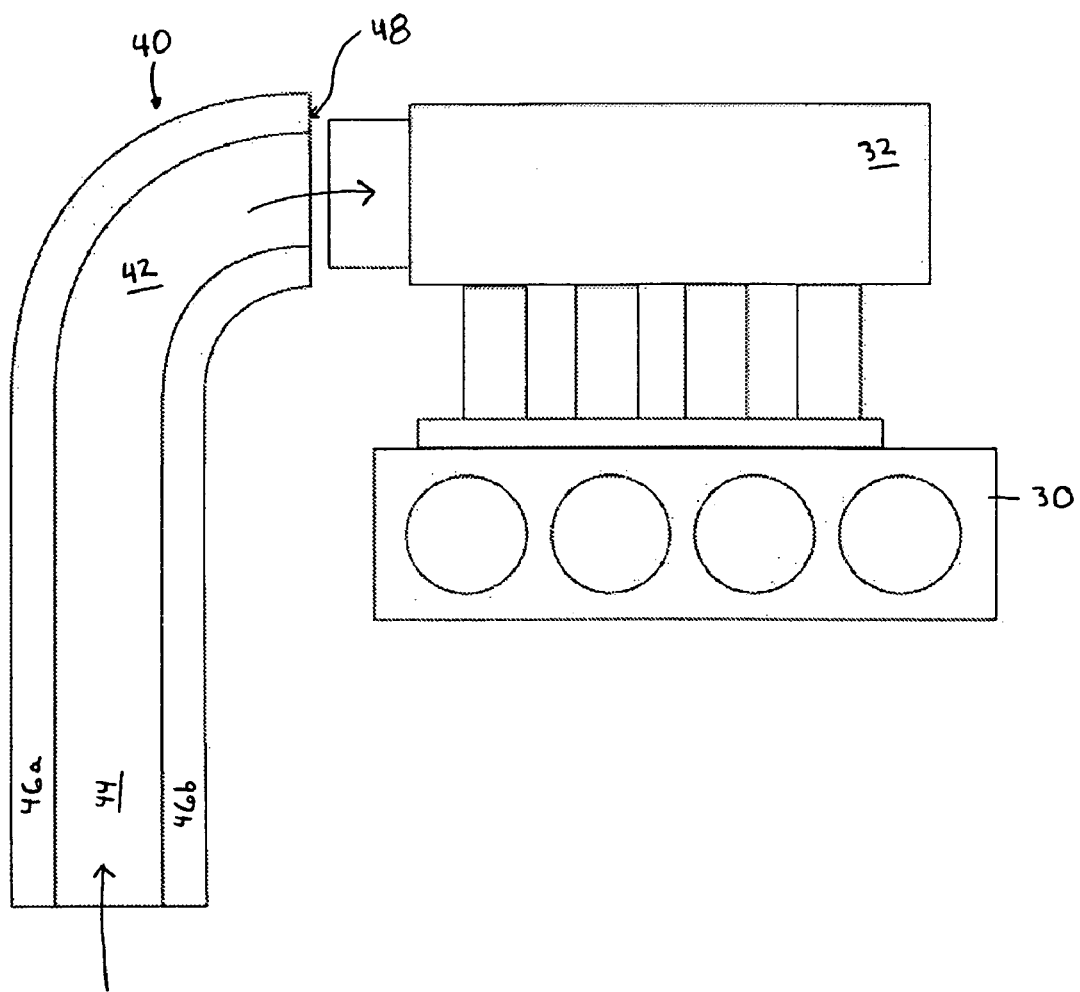
FIG. 2 is a diagram illustrating an gas directing system in accordance with the invention.

FIG. 2 is a diagram illustrating an gas directing system 40 in accordance with the invention which fits onto a typical gas directing manifold 32 so that the gas directing system is attached to the gas directing system of the internal combustion engine 30 in this embodiment. The gas directing system 40 comprises a gas directing mechanism 42 which directs air (as shown by the arrows) from an external source to the gas directing manifold 32. In accordance with the invention, the gas directing system 40 increases the velocity of the air entering the internal combustion engine and increases the airflow by increasing the airspeed of a gas, such as air, into the air intake manifold 32. The gas directing system 40 comprises a dual pathway design (wherein different embodiments of the dual pathway design are described below and illustrated in FIGS. 7A-J and FIGS. 8A-8F). The dual pathway design comprises a first pathway 44 and a second pathway 46a, 46b. In a preferred embodiment, each pathway may be a tube and the first tube 44 may be concentric with and fit within the second tube 46. Thus, the smaller size (the smaller diameter of the first tube 44 in the preferred embodiment) of the first pathway 44 allows a smaller air mass to move at a higher rate of speed than the airflow in the second pathway 46a, 46b. In accordance with the invention, as the two different air masses with different velocities meet at an output end 48 of the gas directing mechanism 42, the air masses are combined and greatly increase the airspeed of the combined air mass. The result is that a greater amount of air moves into the internal combustion engine at a higher rate of speed than is possible with a typical gas directing system.

Figure 3A:
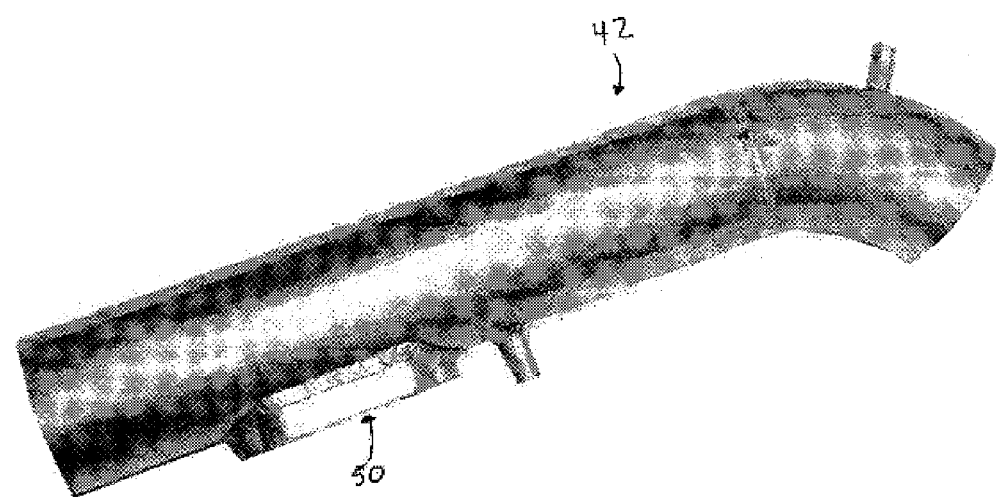
FIGS. 3A and 3B are diagrams illustrating a perspective view and an end view, respectively, of a gas directing mechanism in accordance with the invention.
Figure 3B:
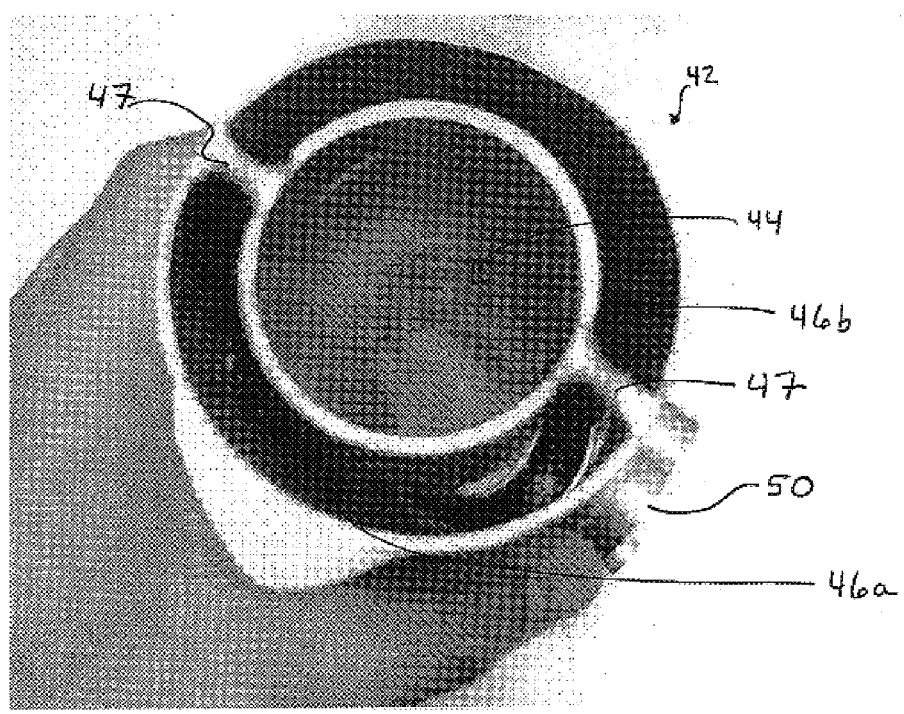
Figure 3C:
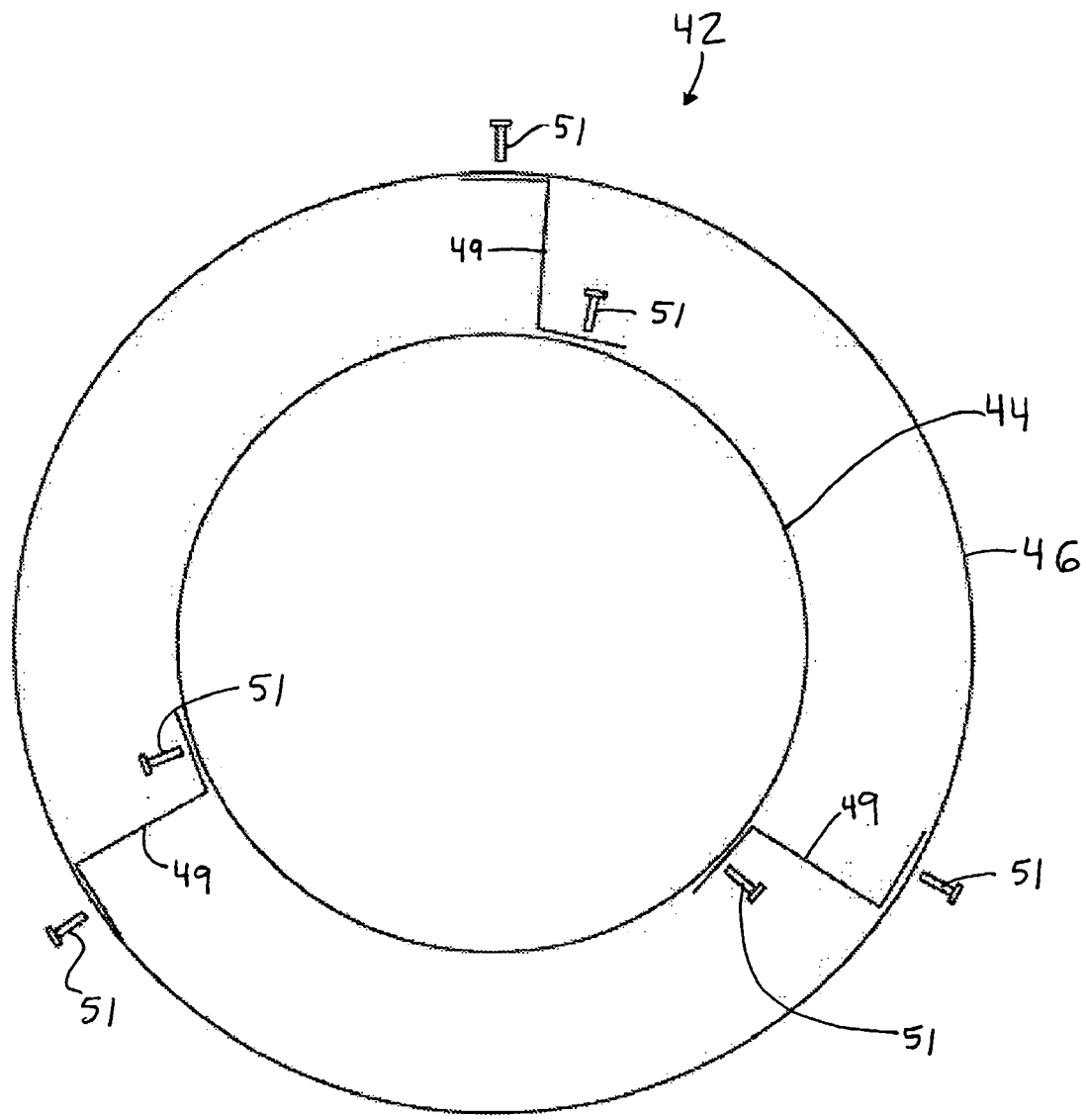
FIG. 3C illustrates a method for connecting the first pathway to the second pathway in accordance with the invention.

FIGS. 3A and 3B are diagrams illustrating a perspective view and an end view, respectively, of an gas directing mechanism 42 in accordance with the invention. As shown in FIG. 3A, the gas directing mechanism 42 may optionally include one or more sensor ports 50. The ports permit a typical air sensor to be attached to the gas directing mechanism, permit a vacuum sensor to be connected to the gas directing mechanism for idle control, and/or permit PCV ports to be connected to the gas directing mechanism for positive crank case ventilation, etc. It should be noted that the gas directing mechanism 42 shown in FIG. 3A has a particular shape (a straight tube with a slightly bent end portion) and that the invention is not limited to any particular shape as the shape will be adjusted/changed depending on the particular internal combustion engine with which it is being used. For example, each different vehicle engine may likely require a slightly differently shaped gas directing mechanism 42. FIG. 3B is an end view of the gas directing mechanism 42 with the first pathway 44 and the second pathway 46a, 46b. In the embodiment shown, the first and second pathways 44 and 46a, 46b are tubes which are concentric and welded to each other using support arms 57. A preferred embodiment of a method for attaching the first and second pathways to each other is shown in FIG. 3C and described below. In this embodiment, the first and second pathways are constructed out of aluminum. However, the invention is not limited to any particular material and may also be made from plastic or other materials that are capable of withstanding the temperatures to which the gas directing mechanism may be subjected. For example, for a gas directing mechanism for an automobile that is housed underneath the hood of the automobile, the gas directing mechanism must be able to withstand the temperatures underneath the hood of the automobile. As set forth above, this gas directing mechanism 42 may be used for both the gas directing system or exhaust system for an internal combustion engine. If it is being used for the air exhaust system, the gas directing mechanism in accordance with the invention may be required to withstand a higher air temperature and be more resistant to damage so it must be made of a different material which is within the scope of the invention.

FIG. 3C illustrates a method for connecting the first pathway 44 and the second pathway 46 to each other. As shown, the gas directing mechanism 42 may further comprise a bracket 49 which is preferably shaped so that the bracket is able to connect the first and second pathways 44, 46 to each other. In the embodiment shown in FIG. 3C, there are three brackets but the invention is not limited to any particular number of brackets. In accordance with the invention, the bracket(s) 49 are attached to each of the first pathway and second pathway. In the example shown in FIG. 3C, the bracket(s) are attached to each pathway using an attachment mechanism 51, such as a rivet. Each bracket may also be welded onto the first and second pathways. To assemble the gas direction mechanism 42, the bracket(s) 49 are attached to the first pathway 44. The first pathway 44 with the bracket(s) 49 attached are inserted into the second pathway 46. The bracket(s) 49 are then attached to the second pathway 46.

Figure 3D:
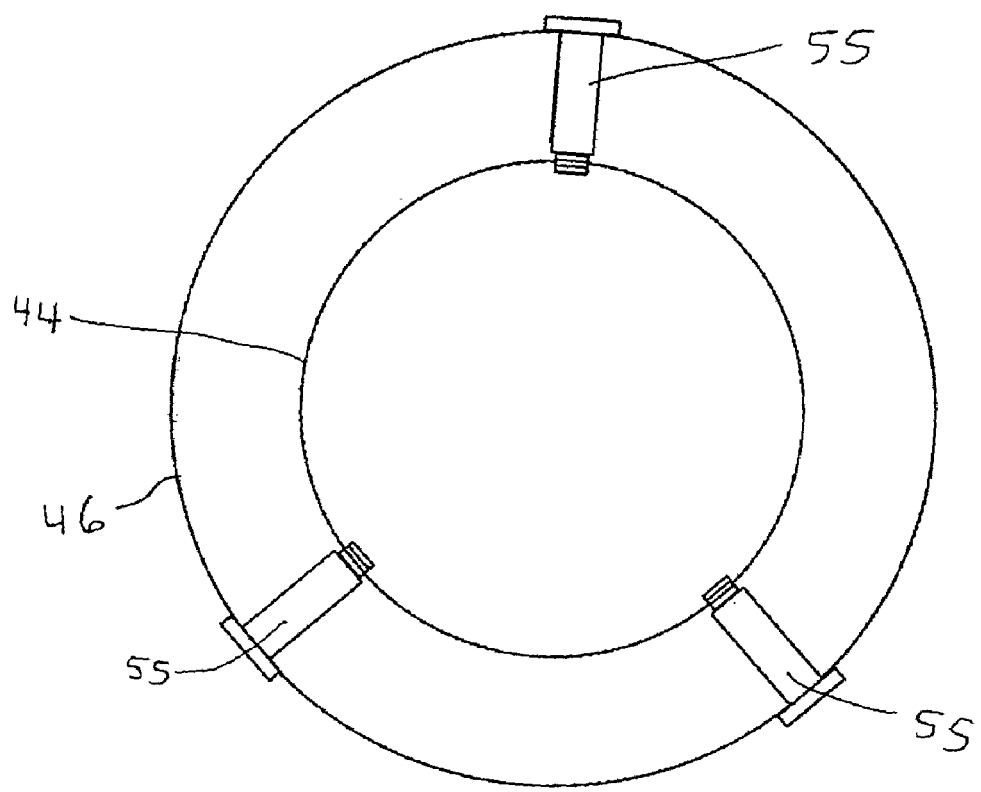
FIG. 3D illustrates a preferred method for connecting the first pathway to the second pathway in accordance with the invention.

FIG. 3D illustrates a preferred method for connecting the first pathway 44 and the second pathway 46 to each other. As shown, the gas directing mechanism 42 may further comprise an attachment device 55 that connects the first and second pathways 44, 46 to each other. In the preferred embodiment shown in FIG. 3D, there are three attachment devices but the invention is not limited to any particular number of attachment devices that may be located at different locations than shown in FIG. 3D. The attachment device 55, which may be a screw or bolt for example, is passed through a hole in the second pathway 46 and then screws into the first pathway 44. Now, more details of the gas directing mechanism 42 will be described.

Figure 4F:
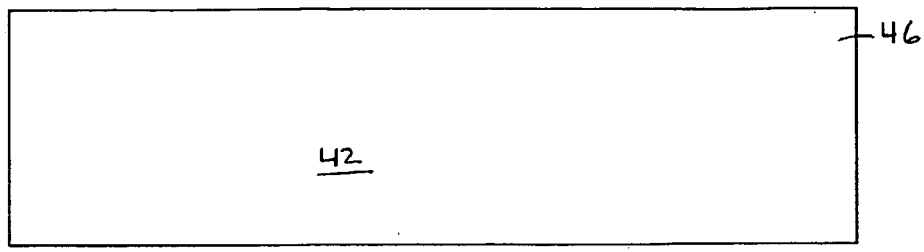
Figure 4E:
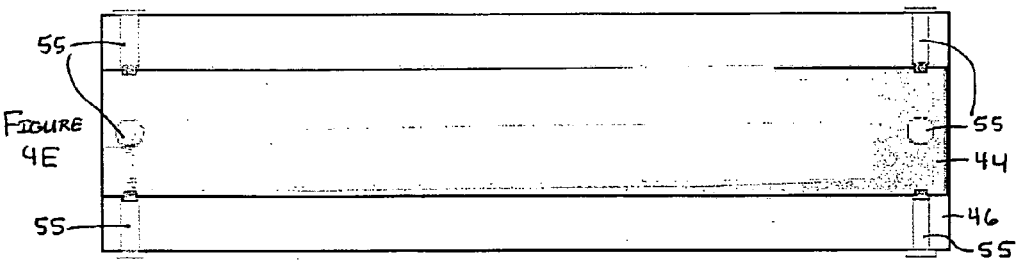
Figure 4D:
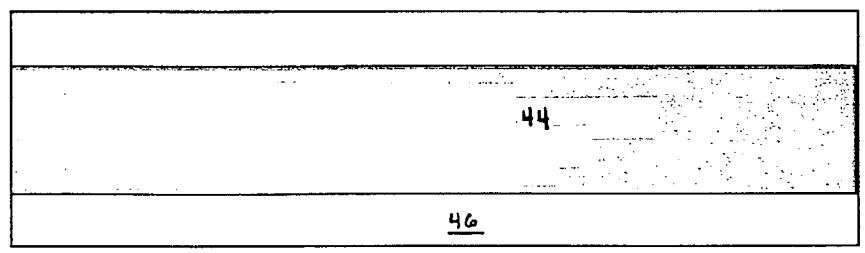
Figure 4B:
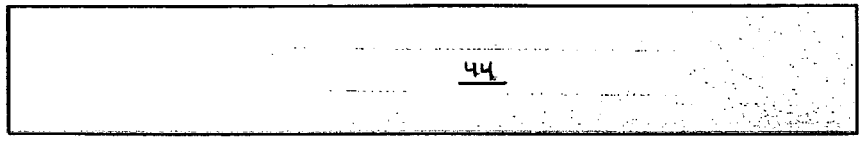
Figure 4A:
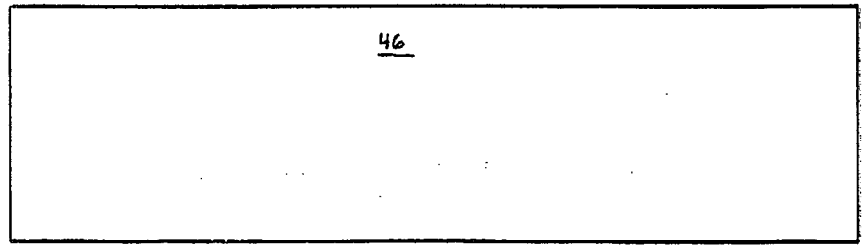

FIGS. 4A-4J illustrate the manufacturing steps of the preferred embodiment of the gas directing mechanism 42 in accordance with the invention. In this preferred embodiment, the first pathway 44 does not extend beyond the second pathway 46. In other embodiments of the invention, the first pathway 44 does extend beyond the second pathway 46 as shown in FIGS. 5A-F and 6A-D. In the preferred embodiment shown in FIGS. 4A-4J, the first pathway 44 and the second pathway 46 are shown in FIGS. 4A, 4B and 4D as a first cylindrical tube 44 and a second cylindrical tube 46. As shown in FIG. 4C1 and 4C2, the first pathway 44 and second pathway 46 in the preferred embodiment are connected to each other by one or more attachment devices 55 that may go through a hole in the second pathway 46 and screw into the first pathway 44 to secure the pathways to each other in the positions shown in FIG. 4C1 and 4C2 although the exact position and shape of the attachment devices 55 may be altered in accordance with the invention. The attachment devices 55 center and align the first pathway 44 with the second pathway 46 as shown in FIG. 4E. In accordance with the invention, the exact positional relationship of the first and second tubes and the attachment devices 55 may be adjusted. FIGS. 4D and 4E are cut-away views in which the internal structure of the gas directing mechanism whereas FIG. 4F is a side view of the gas directing mechanism 42 showing only the second tube 46 as the first tube 44 is inside of the second tube 46.

FIG. 4G illustrates an end view of the gas directing mechanism 42 with the first pathway 44 concentrically inside of the second pathway 46 wherein the positional relationship of the first and second pathways are fixed by the attachment devices 55. In this preferred embodiment, the ratio of the diameter of the first tube to the diameter of the second tube may be ⅔ (and the difference between the diameters may be 1".) In the example shown, the first tube may be 2" in diameter and the second tube may be 3" in diameter. FIG. 4H is a cut-away side view of the preferred embodiment. FIGS. 4I and 4J illustrate the air flow benefits of the gas directing mechanism 42 in accordance with the invention. In particular, the gas entering the mechanism at an intake end 62 exits the mechanism at an exit end 64 with an increased velocity. As shown in FIG. 4I, the gas directing mechanism 42 separates the incoming gas into an inner gas-stream 66 and an outer gas-stream 68 which have different velocities. In particular, based on well known airflow principles, the gasflow in the first tube 44 (which has a smaller diameter) has a greater velocity (approximately double the velocity) than the gas flowing in the second tube 46. Then, when the gas-streams of the first and second tubes meet at the exit point 64, a vacuum is created at that point which doubles the airspeed of the total gas (air, in this example) that enters the internal combustion engine. The result of this gas directing mechanism is an increase in horsepower and torque as will be described below with reference to FIG. 9. Now, other embodiments of the gas directing mechanism in accordance with the invention will be described.

FIGS. 5A-5F illustrate the manufacturing steps of an alternative embodiment of the gas directing mechanism 42 in accordance with the invention in which the first pathway 44 extends beyond the second pathway 46 as shown in FIG. 5F. In particular, the first pathway 44 and the second pathway 46 are shown in FIGS. 5A and 5B as a first cylindrical tube 44 and a second cylindrical tube 46. The gas directing mechanism may further include one or more gas diffusing vanes 52 (six are shown in the embodiment shown in FIG. 5C, although the invention may have no vanes or a plurality of vanes) that direct the gas that enters and exits the gas directing mechanism 42. In more detail, the gas diffusing vanes 52 help center the first tube 44 (in the embodiment in which the first and second tubes are concentric) and provides a more uniformly straight airflow through the gas directing mechanism 42. As shown in FIG. 5D, the gas diffusing vanes 52 are attached to the inside of the second tube 46, such as by welding if an aluminum outer tube and aluminum air diffusing vanes are used, in the positions shown in FIG. 5D although the exact position and shape of the gas diffusing vanes 52 may be altered in accordance with the invention. Then, as shown in FIG. 5E, the first tube 44 is attached to the second tube 46 and the gas diffusing vanes 52, such as by welding in this example, wherein the first tube 44 extends out beyond the second tube slightly and to the ends of the gas diffusing vanes. In accordance with the invention, the exact positional relationship of the first and second tubes and the air diffusing vanes may be adjusted so that, for example, the first tube 44 does not extend beyond the second tube 46. FIGS. 5D and 5E are cut-away views in which the internal structure of the gas directing mechanism is shown whereas FIG. 5F is a side view of the gas directing mechanism 42 showing the first tube 44 and gas diffusing vanes 52 extending beyond the second tube 46. Now, more details of this embodiment of the gas directing mechanism will be described.

Figure 6A:
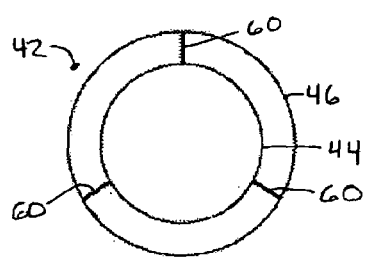
FIGS. 6A-6D illustrate more details of the gas directing mechanism in accordance with the invention.
Figure 6B:
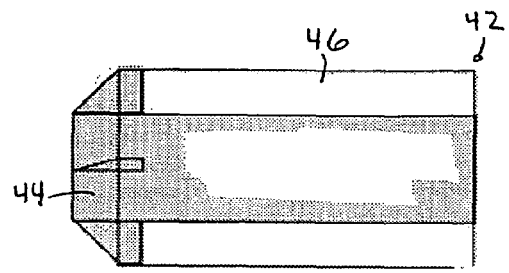
Figure 6C:
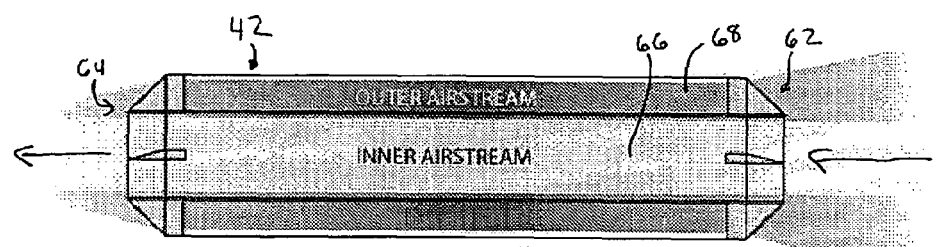
Figure 6D:
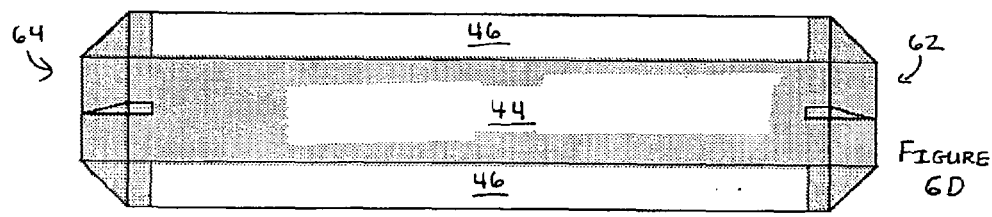

FIGS. 6A-6D illustrate more details of the gas directing mechanism 42 in accordance with the invention. FIG. 6A is an end view of the gas directing mechanism 42 with the first tube 44 and the second tube 46 concentrically positioned. The two tubes are connected to each other by one or more support members 60 as shown. FIG. 6B is a cut-away side view of the embodiment with the first tube 44 extending beyond the second tube 46 (by ½" in a preferred embodiment) wherein the extended first tube 44 helps direct the gases into the gas directing mechanism 42 and also direct the gases/air exiting the gas directing mechanism 42. FIGS. 6C and 6D illustrate the air flow benefits of the gas directing mechanism 42 in accordance with the invention. In particular, the gas entering the mechanism at an intake end 62 exits the mechanism at an exit end 64 with an increased velocity. As shown in FIG. 6C, the gas directing mechanism 42 separates the incoming gas into an inner gas-stream 66 and an outer gas-stream 68 which have different velocities. In particular, based on well known airflow principles, the gasflow in the first tube 44 (which has a smaller diameter) has a greater velocity (approximately double the velocity) than the gas flowing in the second tube 46. Then, when the gas-streams of the first and second tubes meet at the exit point 64, a vacuum is created at that point which doubles the airspeed of the total gas (air, in this example) that enters the internal combustion engine. The result of this gas directing mechanism is an increase in horsepower and torque as will be described below with reference to FIG. 9. Now, other embodiments of the gas directing mechanism in accordance with the invention will be described.

Figure 7A:
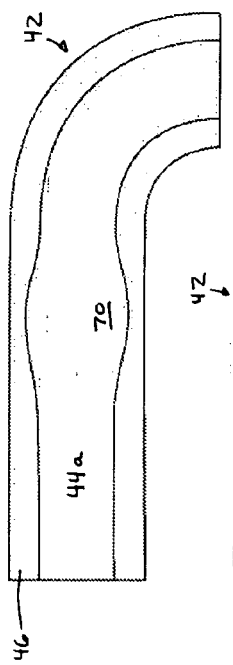
Figure 7B:
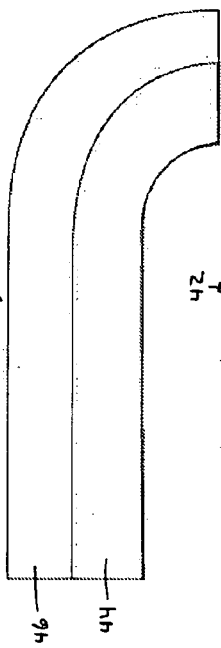
Figure 7C:
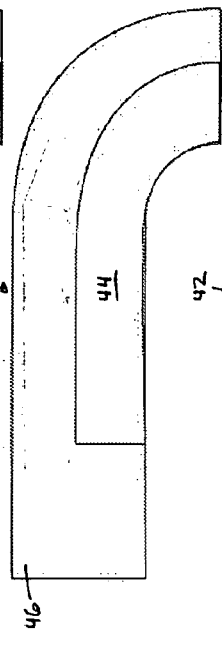
Figure 7D:
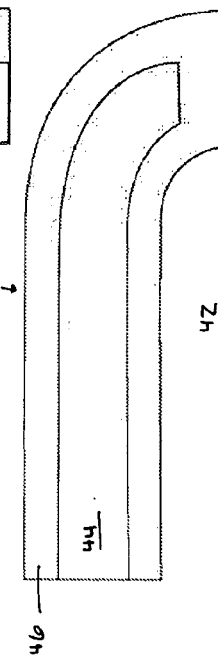
Figure 7E:
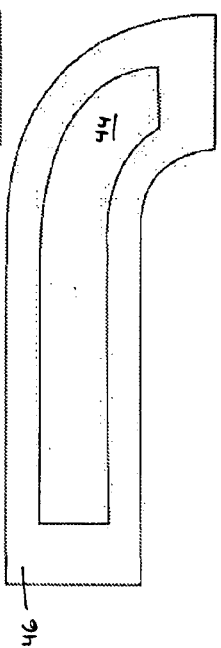

FIGS. 7A-7I illustrate other embodiments of the gas directing mechanism 42 in accordance with the invention which are different from the concentric first and second tube embodiments described above. FIG. 7A shows an gas directing mechanism 42 with a chambered first pathway 44a wherein the first pathway is not concentric with the second pathway 46 along the entire length of the second pathway. The precise position of an expanded region 70 may be moved in accordance with the invention. FIG. 7B illustrates an off-center design in which the first pathway 44 is located away from the center of the second pathway 46, such as along a wall as shown. The first pathway may also be located against the other wall of the second pathway. FIG. 7C illustrates another embodiment with a sectioned off-center design in which the first pathway 44 is off-center and shorter than the second pathway 46 so that one end of the first pathway is within the second pathway. FIG. 7D illustrates another embodiment with a centered, sectioned design in which the first pathway 44 is centered relative to the second pathway, but shorter than the second pathway 46 as shown (so that one end of the first pathway is located within the second pathway). FIG. 7E illustrates another embodiment, similar to that shown in FIG. 7D, wherein both ends of the first pathway 44 are inside of the second pathway 46.

FIG. 7F illustrates another embodiment with a V-shaped sectioned dual pathway design in which a first pathway 44b has a cone shaped end (frustroconical end) and the other end is within the second pathway 46 as shown. FIG. 7G is another embodiment with a first pathway 44c that has a cone shaped end, but both ends are co-extensive with the ends of the second pathway 46. FIG. 7H is another embodiment which has a chambered design wherein a first pathway 44d fills most of the second pathway 46 at the input end and then is tapered at the output end. FIG. 7I is another embodiment of the gas directing mechanism which has a V-shaped chambered design in which a first pathway 44e has an input region and then slightly narrows at the output end. As shown in these figures, the particular shape, orientation and position of the first pathway/tube may be adjusted in many different manners and be within the scope of the invention. Similarly, the shape and size of the second pathway may also be adjusted and is within the scope of the invention. Now, other embodiments of the invention which utilize more than one first pathway will be described.

Figures 8A, 8B:
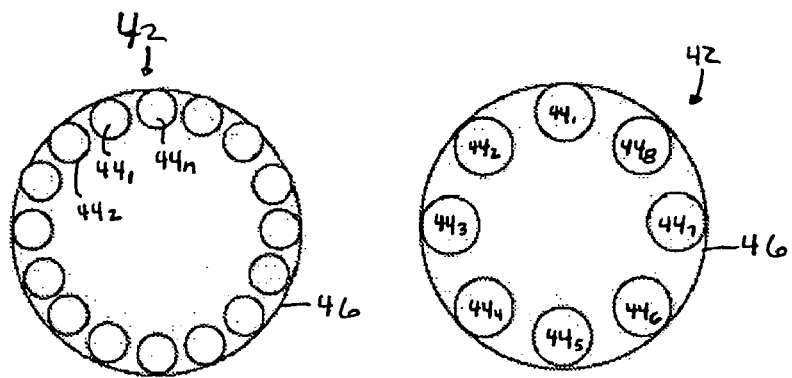
FIGS. 8A-8F illustrate several other embodiments of the gas directing mechanism in accordance with the invention in which there are more than one internal air pathway.
Figures 8C, 8D:
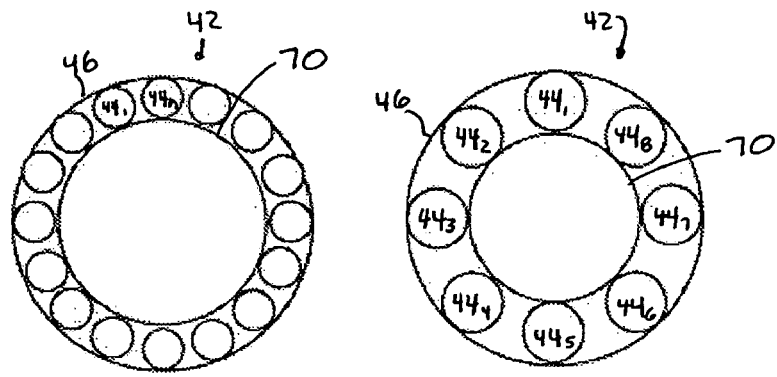
Figures 8E, 8F:
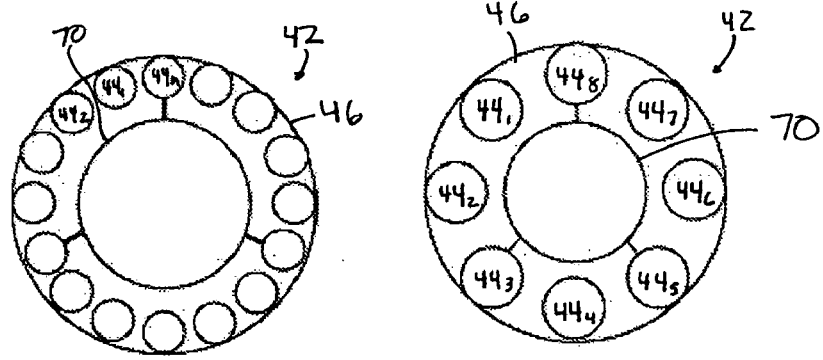

FIGS. 8A-8F illustrate several other embodiments of the gas directing mechanism 42 in accordance with the invention in which there are more than one internal air pathway. For example, FIGS. 8A and 8B illustrate two embodiments that comprise the second pathway 46 and one or more first pathways ($44_1$-$44_n$) inside of the second pathway wherein the multiple smaller first pathways increase the speed of the airflow and the airspeed of the gas exiting the gas directing mechanism. FIGS. 8C and 8D illustrate two other embodiments that comprise the second pathway 46, one or more first pathways ($44_1$-$44_n$) and a third pathway 70 as shown wherein the third pathway 70 is inside of the second pathway 46 and abuts the one or more first pathways as shown so that the first and third pathways are inside of the second pathway 46. In FIGS. 8C and 8D, there is no space between the third pathway 70 and the first pathways 44 as shown. FIGS. 8E and 8F show similar embodiments except that there is a gap between the third pathway 70 and the first pathways 44 as shown. In accordance with the invention, the invention is not limited to these embodiments and encompasses any gas directing mechanism with one or more first pathways 44 (and optionally a third pathway 70) within the second pathway 46.

Figure 9:
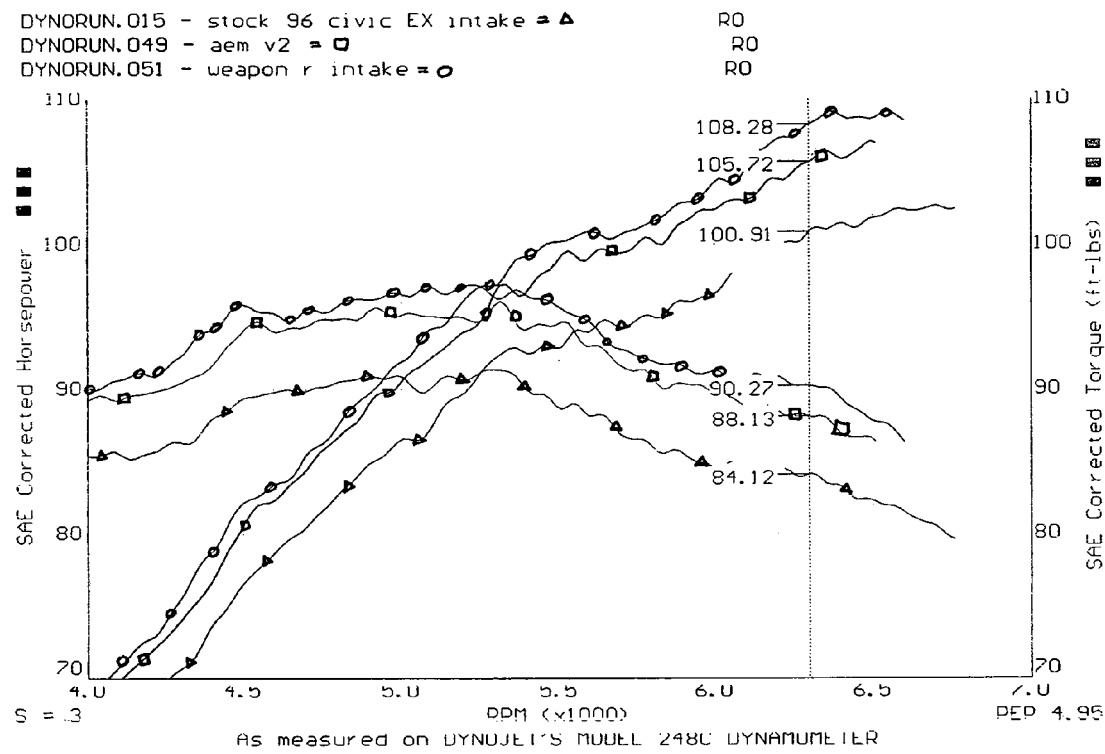
FIG. 9 illustrates a comparison of the performance gains for a typical gas directing system, for the AEM Power intake system and for the gas directing system in accordance with the invention.

FIG. 9 illustrates a comparison of the performance gains for a typical gas directing system, for the AEM Power intake system and for the gas directing system in accordance with the invention. The results shown in FIG. 9 were generated from a dynometer. During each run, a Honda Civic car was placed onto the dynometer and run at a particular speed to determine the maximum horsepower and torque of the engine as is well known. For example, as shown in FIG. 9, the horsepower and torque curves for a conventional air intake system (see curve with triangles along it in FIG. 9) are shown wherein the maximum horsepower is 102.7 and the maximum torque is 91.4. The horsepower and torque curve was then determined for the same car fitted with the AEM Power gas directing system (see curves with boxes along the line) described above. The car with the AEM Power system produced a maximum horsepower of 107.1 and a maximum torque of 96.1 which is an improvement over the typical car. The horsepower and torque curves for the same car fitted with the gas directing system in accordance with the invention was then measured. As shown in FIG. 9, the car with the gas directing system in accordance with the invention (see the curves with the circles along it in FIG. 8) had a maximum horsepower of 109.1 and a maximum torque of 97.2 which is a very significant improvement over the stock car air intake system and a significant improvement over the car fitted with the AEM Power gas directing system. In more detail, the gas directing system in accordance with the invention had a 2% horsepower increase and a 1% torque increase over the AEM Power air intake system.

Figure 10:
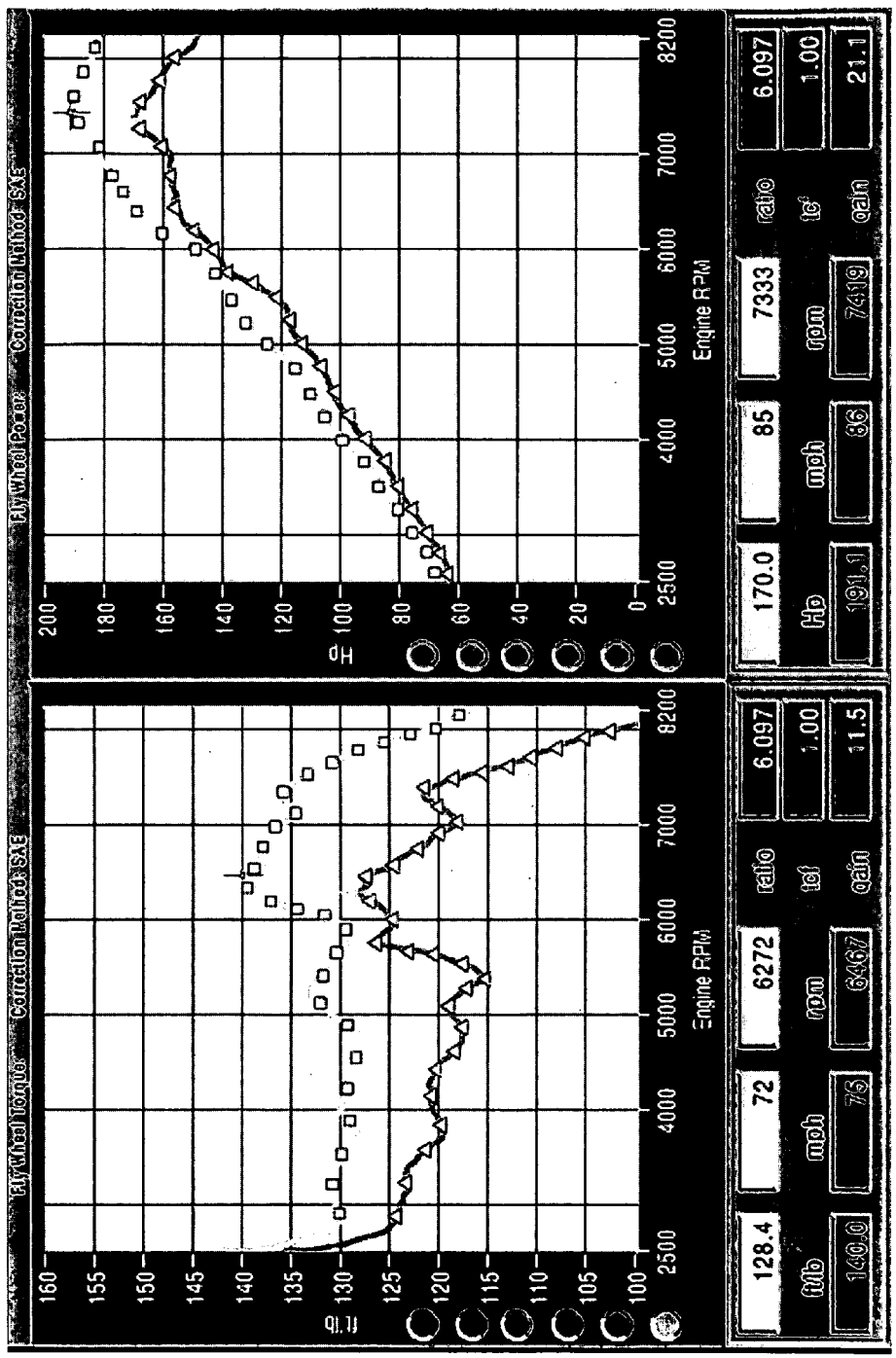
FIG. 10 illustrates a comparison of the horsepower and torque of an engine using a typical gas directing system with a single pipe having a 1.5" radius with the horsepower and torque of an engine using the inventive gas directing device having an outer piper with a 1.5" radius and an inner pipe with 1" radius.

FIG. 10 illustrates a comparison of the horsepower and torque of an engine using a typical gas directing system with a single pipe having a 1.5" radius with the horsepower and torque of an engine using the inventive gas directing device having an outer piper with a 1.5" radius and an inner pipe with 1" radius in which both of the gas directing devices are connected to the same vehicle (an Acura Integra) to provide air intake into the engine. The engine of the vehicle was operated at the same temperature and under the same conditions for both the typical gas directing system and the inventive gas directing system. In the charts of FIG. 10, the revolutions of the engine of the Acura Integra was then increased (when attached to each gas directing device) and the results captured on a dynometer that shows the torque and horsepower of the engine at different RPMs as shown in FIG. 10. The torque (left side chart) and the horsepower (right side chart) values for the typical gas directing system with the single pipe has values that are shown as a line with triangles periodically along the line. The torque (left side chart) and the horsepower (right side chart) values for the inventive gas directing device has values that are shown as a line with squares periodically along the line. As shown in FIG. 10, the inventive gas directing device results in a higher peak horsepower (191.1 vs. 170.0) than the typical single pipe gas directing system. In fact, the horsepower generated by the engine attached to the inventive gas directing system at various different RPMs is always higher than the engine attached to the typical gas directing system.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A gas directing mechanism, comprising:
an internal combustion engine; and
a gas directing mechanism coupled to the internal combustion engine, the gas directing mechanism having a gas inlet into which a gas flows;
a first pathway;
a second pathway;
the first pathway being inside of the second pathway along substantially the entire length of the second pathway so that gas from the gas inlet flows simultaneously through the first and second pathways; and
the gas passing through the first pathway having a first velocity and the gas passing through the second pathway having a second velocity wherein the first velocity gas and second velocity gas combine to form an output gas and a vacuum at the point at which the first and second velocity gases combine to increase the horsepower of the internal combustion engine connected to the gas directing mechanism.

2. The mechanism of claim 1, wherein the first and second pathways each comprise a cylindrical tube.

3. The mechanism of claim 2, wherein the first and second pathways are connected to each other using a bracket.

4. The mechanism of claim 2, wherein the first and second pathways are connected to each other using an attachment device that screws into the first pathway.

5. The mechanism of claim 2, wherein the diameter of the first pathway is one inch smaller than the diameter of the second pathway.

6. The mechanism of claim 2, wherein the ratio of the diameter of the first and second pathways is ⅔.

7. The mechanism of claim 2, wherein the first and second pathways are concentric.

8. The mechanism of claim 7, wherein the first pathway further comprises a central portion wherein the first pathway is closer to the second pathway in the central portion.

9. The mechanism of claim 1, wherein an end of the first pathway extends beyond an end of the second pathway.

10. The mechanism of claim 1 further comprising one or more brackets attached to the second pathway and first pathway that center the first pathway inside of the second pathway.

11. The mechanism of claim 10 further comprising one or more gas directing vanes attached to the second pathway that center the first pathway inside of the second pathway.

12. The mechanism of claim 1, wherein the first pathway is not concentric with the second pathway.

13. The mechanism of claim 1, wherein an end of the first pathway is inside of an end of the second pathway.

14. The mechanism of claim 13, wherein each end of the first pathway is inside of each end of the second pathway.

15. The mechanism of claim 1, wherein the first pathway further comprises a frustroconical input end.

16. The mechanism of claim 15, wherein the first pathway further comprises an output end inside of the second pathway.

17. The mechanism of claim 1, wherein the first pathway and second pathway have a texture applied to an interior surface of the first and second pathways.

18. The mechanism of claim 1, further comprising more than one first pathways inside of the second pathway.

19. The mechanism of claim 18 further comprising a third pathway inside of the second pathway wherein the first pathways and third pathways are adjacent each other.

20. A gas delivery mechanism, comprising:
an internal combustion engine; and
a gas directing mechanism coupled to the internal combustion engine, the gas directing mechanism having a gas inlet into which a gas flows;
a gas outlet;
a first cylindrical tube pathway having a first characteristic, wherein the gas from the gas inlet flows through the first pathway;
a second cylindrical tube pathway having a second characteristic, wherein the gas from the gas inlet flows through the second pathway; and
wherein the difference between the first characteristic and the second characteristic results in a vacuum at the point at which the gases in the first and second pathways combine to increase the horsepower of the internal combustion connected to the gas directing mechanism.

21. The mechanism of claim 20, wherein the first and second pathways are connected to each other using a bracket.

22. The mechanism of claim 20, wherein the first and second pathways are connected to each other using an attachment device that screws into the first pathway.

23. The mechanism of claim 20, wherein the first and second pathways are concentric.

24. The mechanism of claim 23 further comprising one or more gas directing vanes attached to the second pathway that center the first pathway inside of the second pathway.

25. The mechanism of claim 23, wherein the first pathway further comprises a central portion wherein the first pathway is closer to the second pathway in the central portion.

26. The mechanism of claim 20, wherein an end of the first pathway extends beyond an end of the second pathway.

27. The mechanism of claim 20 further comprising one or more brackets attached to the second and first pathways that center the first pathway inside of the second pathway.

28. The mechanism of claim 20, wherein the first pathway is not concentric with the second pathway.

29. The mechanism of claim 20, wherein an end of the first pathway is inside of an end of the second pathway.

30. The mechanism of claim 29, wherein each end of the first pathway is inside of each end of the second pathway.

31. The mechanism of claim 20, wherein the first pathway further comprises a frustroconical input end.

32. The mechanism of claim 31, wherein the first pathway further comprises an output end inside of the second pathway.

33. The mechanism of claim 20, wherein the first pathway and second pathway have a texture applied to an interior surface of the first and second pathways.

34. The mechanism of claim 20, wherein the diameter of the first pathway is one inch smaller than the diameter of the second pathway.

35. The mechanism of claim 20, wherein the ratio of the diameter of the first and second pathways is ⅔.

36. The mechanism of claim 20, wherein the gas further comprises air and the gas directing mechanism is part of an air intake system for an internal combustion engine.

37. The mechanism of claim 20, further comprising more than one first pathways inside of the second pathway.

38. The mechanism of claim 37 further comprising a third pathway inside of the second pathway wherein the first pathways and third pathways are adjacent each other.

* * * * *